(12) United States Patent
Yukio et al.

(10) Patent No.: US 6,906,286 B2
(45) Date of Patent: Jun. 14, 2005

(54) SOLID WIRE FOR ARC WELDING

(75) Inventors: Yamaoka Yukio, Osaka (JP); Geun Chul Song, Changwon (KR)

(73) Assignee: Kiswel Ltd., Busan (KR)

( * ) Notice: Subject to any disclaimer, the term of this patent is extended or adjusted under 35 U.S.C. 154(b) by 207 days.

(21) Appl. No.: 10/414,111

(22) Filed: Apr. 14, 2003

(65) Prior Publication Data

US 2004/0050835 A1 Mar. 18, 2004

(30) Foreign Application Priority Data

Sep. 12, 2002 (JP) .................................. 2002-267441

(51) Int. Cl.$^7$ .............................................. B23K 35/02
(52) U.S. Cl. ................................................. 219/145.1
(58) Field of Search .......................... 219/145.1, 146.1, 219/145.22, 145.23

(56) References Cited

U.S. PATENT DOCUMENTS

| | | | | |
|---|---|---|---|---|
| 5,550,348 | A | * | 8/1996 | Masaie et al. ......... 219/145.22 |
| 6,062,386 | A | * | 5/2000 | Inoue et al. ................. 206/397 |
| 2003/0085211 | A1 | * | 5/2003 | Ito et al. ................... 219/146.1 |

FOREIGN PATENT DOCUMENTS

| | | |
|---|---|---|
| JP | 1-166899 A | 6/1989 |
| JP | 2-284792 A | 11/1990 |
| JP | 7-47490 A | 2/1995 |
| JP | 7-223087 A | 8/1995 |
| JP | 7-328789 A | 12/1995 |
| JP | 8-197278 | 8/1996 |
| JP | 2682814 B2 | 8/1997 |
| JP | 9-323191 | 12/1997 |
| JP | 11-147174 A | 6/1999 |
| JP | 2000-94178 A | 4/2000 |
| JP | 2003-17679 A | 11/2000 |
| JP | 2001-191915 A | 7/2001 |

* cited by examiner

*Primary Examiner*—M. Alexandra Elve
(74) *Attorney, Agent, or Firm*—Squire, Sanders & Dempsey L.L.P.

(57) ABSTRACT

Disclosed is a solid wire for arc welding, including: a flat portion of a wire surface with no copper plating, wherein micro Vickers hardness (Hv) of the flat portion is in the range of 115 to 310 and arithmetical average roughness (Ra) of the flat portion is in the range of 0.01 to 0.30·m. The solid wire is based on a new concept different from a conventional solid wire. The solid wire for arc welding has excellent feedability without copper plating, thereby improving weld workability. Consumption of energy during manufacture of the solid wire can be reduced because the solid wire is manufactured without copper plating, and a weld work environment can be improved because copper fumes are not generated.

3 Claims, 3 Drawing Sheets

Fig. 1 inventive wire surface white: flat portion    black: lubricant-rich pool (30.5%)

Fig. 2

Fig. 3 conventional sample
(surface has form of prominences and depressions and flat portion is unclear)

inventive sample
(surface has form of depressions and flat portion is clear)

A : flat portion   B : lubricant-rich pool

Fig. 4

SOLID WIRE FOR ARC WELDING

PRIORITY REFERENCE TO PRIOR APPLICATION

This application claims benefit under 35 U.S.C. §119 of Japanese patent application number 2002-267441, entitled "Solid Wire for Arc Welding," filed on Sep. 12, 2002, by inventors Yamaoka Yukio & Geun Chul Song.

BACKGROUND OF THE INVENTION

1. Field of the Invention

The present invention relates to wires for automatic or semi-automatic arc welding, and more particularly to an improved wire for semi-automatic arc welding with no copper plating, wherein feedability of the improved wire with no copper plating is superior to that of a solid wire with copper plating.

2. Description of the Related Art

These days, as automation or semi-automation of welding work proceeds, applications of a solid wire for gas arc welding have been significantly enlarged, particularly, in industrial fields of steel framing, automobile fabrication, shipbuilding, and building construction.

In this type of a solid wire, it is the norm that a surface of the solid wire is plated with copper to secure current-carrying characteristic and, more particularly, feedability. However, the solid wire with copper plating, which is consumed in large quantities, has the following problems, as are well known.

(a) When performing a drawing process upon manufacture of the wire, part of copper plating in the form of fine copper powder are separated from the wire, and the separated copper powder remains attached to fine prominences and depressions of the wire surface. The fine powder is then separated from the wire due to the friction between a cable or an inner sidewall of a tip and a wire, and the separated fine power is accumulated inside the tip to cause clogging, thereby deteriorating the wire feedability.

(b) Because copper is soft, the copper itself peels off due to the friction with the inner sidewall of the tip, thereby deteriorating the wire feedability.

(c) Copper is vaporized within ultrahigh temperature arc during welding and copper fumes are generated, resulting in undesirably injuring a person's health.

Methods for improving the feedability mentioned at the above (a) and (b) are proposed in Japanese Laid-open Patent Publication Nos. Heisei 1-166899, Heisei 2-284792, Heisei 7-47490, Heisei 7-223087, Heisei 7-328789, Heisei 8-197278, Heisei 9-323191, etc.

To address the feedability problem, the above-described Japanese Laid-open Patent Publications include the following processes of:

(1) coating a metal salt of a fatty acid;
(2) coating a mixture of a metal soap and oil;
(3) carrying out surface carburization, forming a crack in a carburization layer and filling the crack with a lubricant;
(4) forming artificial prominences and depressions on a surface, and filling the prominences and depressions with a lubricant;
(5) forming prominences on a wire surface, determining roughness and filling an uneven surface with a lubricant; and
(6) coating a mixture of $MoS_2$, $WS_2$, $TiO_2$, etc. on the wire surface.

The above-described processes of the above Japanese Laid-open Patent Publications cannot completely address the above-described problems (a) and (b).

To address several problems associated with the copper plating, solid wires on which the copper plating is not applied are developed.

The above-described problem (c) is addressed by not applying the copper plating on the wire, but several problems associated with the wire feedability still remain. To address the several problems associated with the wire feedability, various improved technologies are proposed, for example, in Japanese Patent No. 2682814, and Japanese Laid-open Patent Publication Nos. Heisei 11-147174, 2000-94178, 2000-317679, 2001-191195, etc. These technologies include the following processes:

(1) defining a specific surface area, coating $MoS_2$, oil, alkali metal, etc. on the specific surface area, and simultaneously attaching materials in an amount less than 2.0 $g/m^2$ to a surface;
(2) coating $MoS_2$ on the wire and separating $MoS_2$ in a weld conduit tube, thereby improving the wire feedability;
(3) forming prominences and depressions on a surface using a temporary dull finish roller and filling the prominences and depressions with $MoS_2$, $WS_2$, C, Na, K, Cs, etc., thereby improving the wire feedability;
(4) attaching C, TiC, WC, $Al_2O_3$, $SiO_2$, FeO, ZnO, SnO, $TiO_2$, FC, $MoS_2$, BN, $WS_2$, FeS, TiN, CrN, or SN, ZN, Cu or Fe powder together with a water soluble polymer to a wire, or coating oil on the wire, thereby improving the wire feedability (coating of insulating inorganic powder such as C, TiC, etc. and coating of conductive inorganic powder such as Sn, Zn, etc.); and
(5) defining O: 10–300 ppm, S: 0.0005–0.02%, C: 0.005–0.15%, Si: 0.2–1.2% and Mn: 1.0–2.2% contained in the wire, defining C: 0.005–3.0% detached from a wire surface based on 10 kg of a wire, defining case where Ti: 0.10–0.35% is contained in the wire or a ratio of the detached C/S+O or coating $MoS_2$ on the wire surface, and defining a ratio of the detached $C/MoS_2$, thereby improving the wire feedability.

Although the above-described processes (1) to (5) are performed, the feedability of a wire with no copper plating is not superior to that of a wire with copper plating. Thus, the feedability of a wire with no copper plating should be improved.

That is, the development of technology for improving the feedability of a wire with no copper plating superior to that of a wire with copper plating, is seriously required.

The inventors of the present invention reached the conclusion that factors of roughness of a surface, a specific surface area, prominences and depressions, various coating materials, etc. in both cases of solid wires which copper plating and no copper plating be adjusted cannot improve the feedability, which is the most important characteristic of a solid wire.

Thus, as a result of carrying out detailed investigations into surface friction between a traveling wire and a conduit cable or a welding tip, the inventors of the present invention found that a solid wire with no copper plating having excellent feedability is achieved if materials capable of remarkably reducing friction are provided on an entire flat surface in a sufficient amount, because a surface of an ideal solid wire is flat like a surface of a mirror. This idea is based on the fact that complete frictionless movement of a material appears where oil is dropped on a glass surface of a mirror and then the material is put on the oil dropped on the glass.

The inventors of the present invention embodied the idea using a new method different from the conventional method through definition of microscopic characteristics of a wire surface, suitable coating material selection and the ensuring of a stable source for providing a lubricant coating material to the wire surface, and succeeded in significantly improving the feedability of a solid wire with no copper plating.

SUMMARY OF THE INVENTION

Therefore, the present invention has been made in view of the above problems, and it is an object of the present invention to provide a solid wire for arc welding with no copper plating, wherein feedability of the improved wire with no copper plating is superior to that of a solid wire with copper plating.

In accordance with an aspect of the present invention, the above object can be accomplished by the provision of a solid wire for arc welding, comprising: a flat portion of a wire surface, wherein micro Vickers hardness (Hv) of the flat portion is in the range of from 115 to 310 and arithmetical average roughness (Ra) of the flat portion is in the range of 0.01 to 0.30·m. In this case, a ratio of an area of lubricant-rich pools to a unit area of the wire surface is adjusted in the range of 15 to 88%. Further, at least one component selected from a group of $MoS_2$, BN and a mixture thereof is preferably coated on the wire surface in an amount of from 0.002 to 0.40 g/m².

With a new manufacturing concept different from the conventional manufacturing concept, the present invention can provide a solid wire for arc welding, which has excellent feedability with no copper plating. Also, the feedability of the solid wire with no copper plating in accordance with the present invention is equal to or better than the conventional solid wire with copper plating, thereby improving welding workability. Further, since a process of applying the copper plating is not needed, consumption of energy can be reduced. Furthermore, since copper fumes are not generated, a welding work environment can be improved.

The ratio of an area of lubricant-rich pools to a unit area is adjusted in the above-described range. Thus, friction-reducing materials, to be provided to a flat portion of the wire surface, are not exhausted, thereby implementing excellent feedability.

Further, where at least one component selected from a group of $MoS_2$, BN and a mixture thereof is coated on the wire surface in an amount of from 0.002 to 0.40 g/m², because the lubricant-rich pools of the present invention are completely formed by depressions in which a drawing lubricant material is completely removed, the lubricant-rich pools can be sufficiently filled with at least one component selected from a group of $MoS_2$, BN and a mixture thereof, thereby implementing excellent feedability.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

A detailed description of the present invention is as follows. First, the present invention is based on four factors:

(1) micro Vickers hardness (loading weight of 1 g) of a flat portion of a wire surface;

(2) average roughness (Ra) of the flat portion of the wire surface;

(3) a ratio of an area of lubricant-rich pools to a unit area of a wire surface; and (4) a coating amount of at least one component selected from a group of $MoS_2$, BN and a mixture thereof.

Further, the present invention basically includes processes of preparing a rod, pickling, coating, dry drawing, wet drawing (including a low reduction skin pass), electrolytic cleaning (based on an alkaline solution and a bipolar method), coating rust-preventing oil and winding.

The above-described four factors (1)–(4) associated with the basic processes will be described. Further, the surface of the wire will be described with reference to an enlarged microscopic image shown in FIG. 1.

(1) Adjustment of Micro Vickers Hardness of Flat Portion

Figure 1:
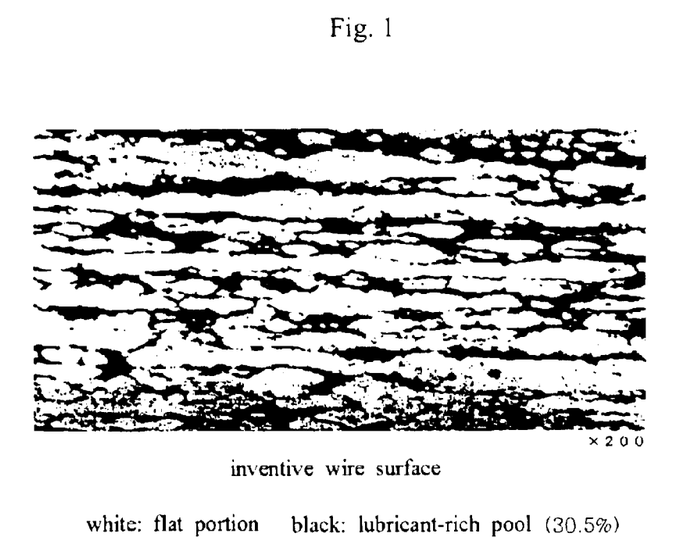
FIG. 1 is an enlarged microscopic image (×200) illustrating a wire surface in accordance with the present invention.

Micro-hardness of a wire surface means hardness of a white portion (flat portion) in the enlarged microscopic image shown in FIG. 1. The hardness of this portion is adjusted by an entire processing degree and a final wet skin pass.

Hardness of the wire surface is conventionally proportional to the entire processing degree, but the inventors of the present invention found that friction between the wire and a conduit cable or a welding tip is controlled by hardness of a micro portion underneath the wire surface rather than entire hardness. Thus, Vickers hardness is measured under a loading weight of 1 g. It is important that the Vickers hardness measured under the loading weight of 1 g means hardness corresponding to a portion below 1·m from the wire surface. The hardness of the micro portion cannot be adjusted by only the entire processing degree.

So, the hardness of the micro portion is adjusted by varying a processing degree in a final wet skin pass in the range of 3~10%, varying an entire angle $2\alpha$ of dies in the range of 8~40° and combining them. In particular, if the entire angle of dies is increased, the lowest reduction drawing is focused on only the wire surface and the hardness of the micro portion of the wire surface is increased. In case the entire angle of dies in the skin pass is increased, the occurrence of a die mark on the wire surface is prevented by means of lowering the reduction rate of the wire.

Further, where micro hardness of the flat portion is lowered, an intermediate annealing process is carried out during the dry drawing process and then processes of pickling, coating, dry drawing (low reduction rate), wet drawing (skin pass of a low reduction rate) and degreasing are carried out. WC dies are used for the dry drawing process, and PCD diamond dies are used for the wet drawing process.

(2) Adjustment of Arithmetical Average Roughness (Ra)

The flat portion of the where surface is defined by way of only the dry drawing process. However, at this time, roughness of the flat portion becomes significantly worse. The present invention aims to lower the roughness of the flat portion, as in the effect of the above-described "oil on the glass of the mirror surface" example.

Thus, in accordance with the present invention, the wet drawing process is adjusted by a combination of a conventional wet drawing and a low reduction rate skin pass. The roughness of the flat portion of the wire surface can be lowered, but the conventional wet drawing process has to be combined with the present invention to effectively adjust the roughness.

(3) Adjustment of Ratio of Area of Lubricant-rich Pools to Unit Area of Wire Surface A ratio of an area of lubricant-rich pools preferably depends upon a drawing lubrication state.

Accordingly, the present invention provides sufficient lubricant-rich pools up to the dry drawing process in the above-described basic processes, and the subsequent wet drawing process enlarges the flat portion, thereby adjusting an area of the lubricant-rich pools.

It is preferable to make the wire surface rough after the pickling process in order to provide the sufficient lubricant-rich pools in the dry drawing process, and a lubrication method by compulsory lubrication drawing (based on double dies) or compression rollers is used to provide the sufficient lubricant-rich pools in the drawing process. After the pickling process, desired roughness of the wire surface can be achieved by combining a pickling time, a pickling temperature, etc.

(4) Coating of at Least One Component Selected from Group of $MoS_2$ Powder, BN Powder or Mixture Thereof In coating of at least one component selected from a group of $MoS_2$, BN or a mixture thereof, micro powder is mixed in rust-preventing oil and an amount of coating for the wire is adjusted according to a mixing ratio.

The coating method sandwiches a traveling wire between two sheets of felt paper and drops the oil on the felt paper.

Figure 2:
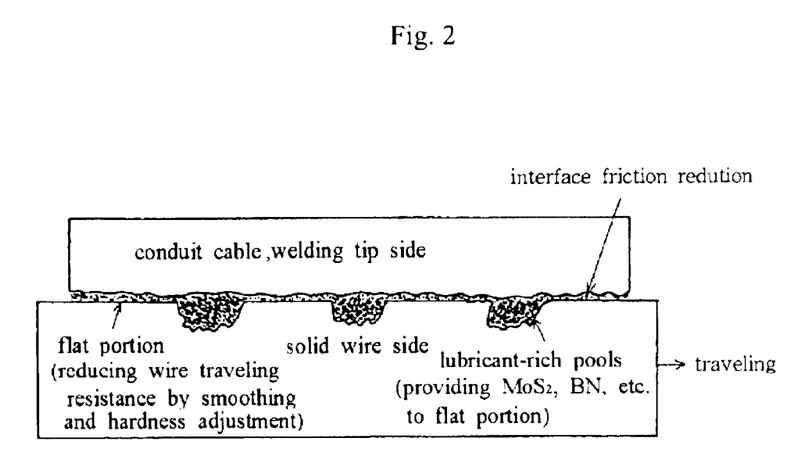
FIG. 2 is a view explaining the principle of the improved wire feedability in accordance with the present invention.

As seen from the above description, the hardness and roughness of the flat portion of the wire surface are adjusted as shown in FIG. 2 in accordance with the present invention (the roughness is adjusted so that the wire surface can be as smooth as possible, and the present invention does not carry out a conventional process of forming severe prominences and depressions and filling the prominences and depressions with lubricating materials).

Further, the lubricant-rich pools are completely formed by depressions in which the drawing lubrication materials are all removed by bipolar electrolytic cleaning as described in the basic processes. The friction-reducing materials such as $MoS_2$, BN, etc. can be filled in the depressions and hence a ratio of an area of lubricant-rich pools to a unit area of a wire surface is defined. Thus, $MoS_2$, BN, etc., to be provided to a flat portion of the wire surface, are not exhausted, thereby implementing excellent wire feedability.

The present invention is implemented by new technology based on "hardness of a surface layer of the flat portion and smoothing, obvious lubricant residue (in depressions of the lubricant-rich pools), and specifying lubrication material" rather than the conventional technology based on "definition of prominences and depressions on the wire surface and coating materials". Optimum values of factors will now be described.

Further, because a large amount of the drawing lubricant softened by heat generated during the drawing process remains within the conventional lubricant-rich pools, although $MoS_2$, etc. are coated in the lubricant-rich pools, those cannot be appropriately maintained. In this point, the lubricant-rich pools of the present invention are material-rich pools capable of improving the wire feedability and addressing the above problem, and are an important characteristic of the present invention.

Next, experiments defining optimum values corresponding to the above-described four factors will be described.

(1) Optimum Value of Micro Vickers Hardness of Flat Portion

When the flat portion shown in FIG. 1 is measured under a loading weight of 1 g, an optimum value of micro Vickers hardness (Hv) is in the range of 115 to 310.

Striation may occur because the flat portion is very soft where the Hv is less than 115 and hence the wire surface becomes abruptly rough while the wire is moved, thereby negatively affecting the wire feedability. Because the flat portion becomes very hard if the Hv exceeds 310, a sidewall of a conduit cable or a welding tip can be easily worn and abraded, thereby deteriorating the wire feedability.

(2) Optimum Value of Arithmetical Average Roughness (Ra) of Flat Portion

Figure 3:
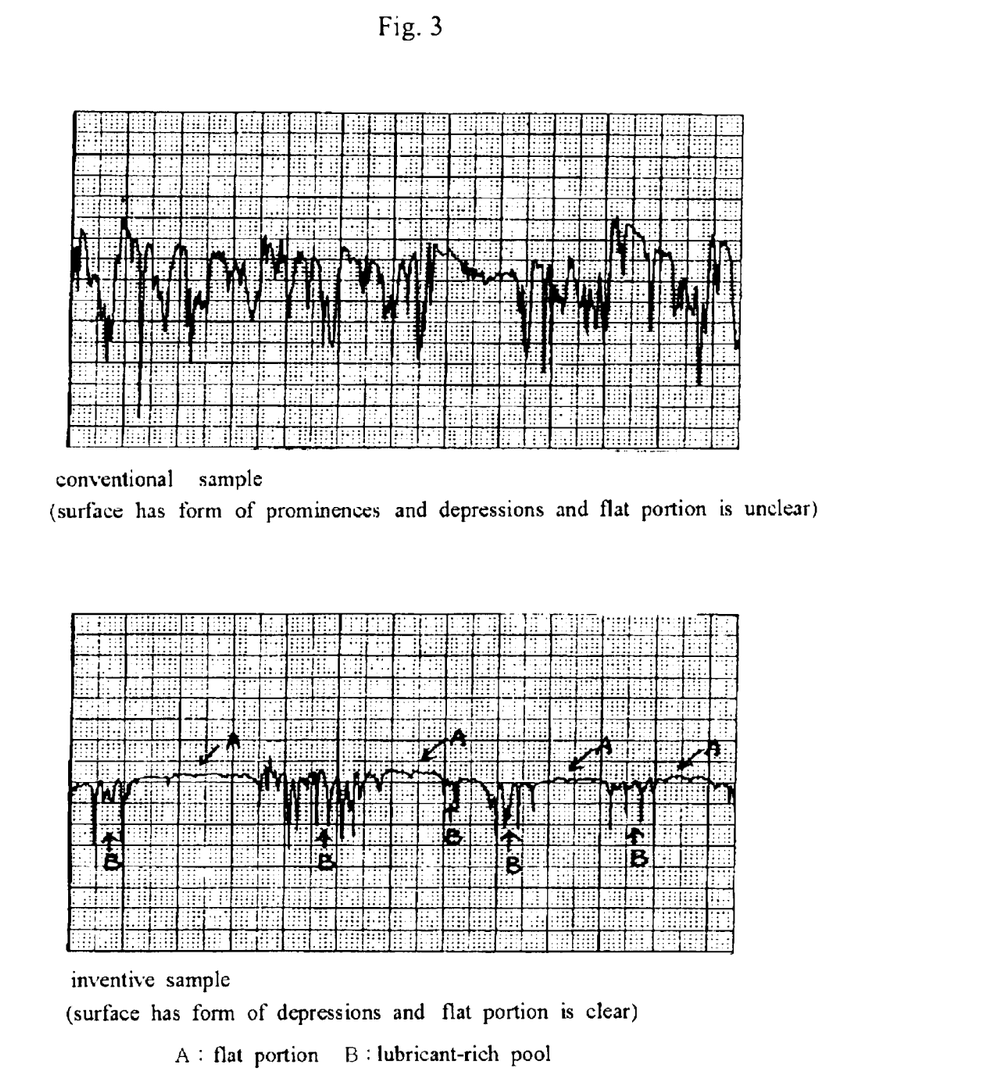
FIG. 3 is graphs comparing the roughnesses of an inventive wire surface and a conventional wire surface.

FIG. 3 is graphs comparing the roughnesses of an inventive wire surface and a conventional wire surface. The roughness of the inventive wire surface is fundamentally different from that of the conventional wire surface. The roughness of the conventional wire surface is based on prominences and depressions, while the roughness of the inventive wire surface is based on depressions.

To optimize the roughness of the flat portion on the wire surface in the present invention, the optimum value of its Ra is in the range of 0.01 to 0.30 ·m.

As the smoothing proceeds from the Ra of 0.01·m, the lubrication state is poor during drawing and stable production cannot be achieved by means of a die mark, etc. Thus, the smoothing must proceed on the basis of the Ra of over 0.01·m. Further, as the arithmetical average roughness (Ra) exceeds 0.30·m, prominences are increased on the wire surface and hence resistance is increased, thereby deteriorating the feedability.

(3) Optimum Value of Ratio of Area of Lubricant-rich Pools to Unit Area of Wire Surface As described above, the lubricant-rich pools of the present invention are completely formed by depressions after drawing and electrolytic cleaning.

Special lubricating materials are retained in the depressions to improve lubricating effect. It is obvious that the area ratio of the depressions is associated with the wire feedability. If the wire is moved through the welding cable, $MoS_2$, BN, etc. are provided from the lubricant-rich pools to the flat portion. In accordance with the present invention, an optimum value of a ratio of an area of the lubricant-rich pools to a unit area of the wire surface is in the range of 15 to 88%.

When the area ratio is less than 15%, the lubricating materials are not sufficiently provided, thereby deteriorating the wire feedability. When the area ratio exceeds 88%, an amount of lubricating materials detached from the conduit cable or the welding tip is increased, thereby deteriorating the wire feedability.

(4) Optimum Value of Amount of Coating of at Least One Component Selected from Group of $MoS_2$, BN or Mixture Powder Thereof As described above, the two materials in the form of powder are either independently coated or alternatively coated in the state of mixing in any ratio of from 0:100% to 100:0%, it is expected that this case achieves the same effect as the former cases. When $MoS_2$ and BN are independently coated or at least one component of a mixture thereof is coated, the above-described cases achieve the same effect. Also, an optimum amount of the coating is in the range of 0.002 to 0.40 $g/m^2$.

When the coating amount is less than 0.002 $g/m^2$, an amount of $MoS_2$ or BN remaining on the bottoms of the depressions is insufficient, thereby deteriorating the wire feedability. Further, when the coating amount is over 0.40 $g/m^2$, an amount of $MoS_2$ or BN detached from the conduit tube is increased, thereby causing clogging and deteriorating the wire feedability.

As described above, the factors (1), (2) and (3) are interdependent in the present invention, and the factors (1), (2) and (4) are also interdependent in the present invention. Thus, each factor depends upon other factors. Further, if a value of one of the factors (1), (2) and (3) or a value of one of the factors (1), (2) and (4) is out of an optimum value range, the wire feedability is deteriorated. Accordingly, to manufacture a solid wire with no copper plating equal to or better than the feedability of a solid wire with copper plating, optimum values/ranges of the respective factors must be satisfied. These points can be referred to as characteristics of the present invention.

Hereinafter, a description will be given of a method for measuring the wire feedability, micro Vickers hardness, average roughness (Ra), a ratio of an area of the lubricant-rich pools to a unit area of the wire surface and an amount of coating of $MoS_2$, BN, etc.

(1) Method for Evaluating Wire Feedability (a) The wire feedability indicates whether the solid wire is provided at a constant speed from the welding tip or not. If the wire feedability is poor and hence the wire feeding is insufficient, a length of arc column is long and then the welding arc is unstable (the welding arc is lengthened) and a welding droplet is bounced and spattered by arc force. Accordingly, the superiority or inferiority of the wire feedability can be determined by measuring an amount of generated spatter after performing welding for a predetermined period of time.

Figure 4:
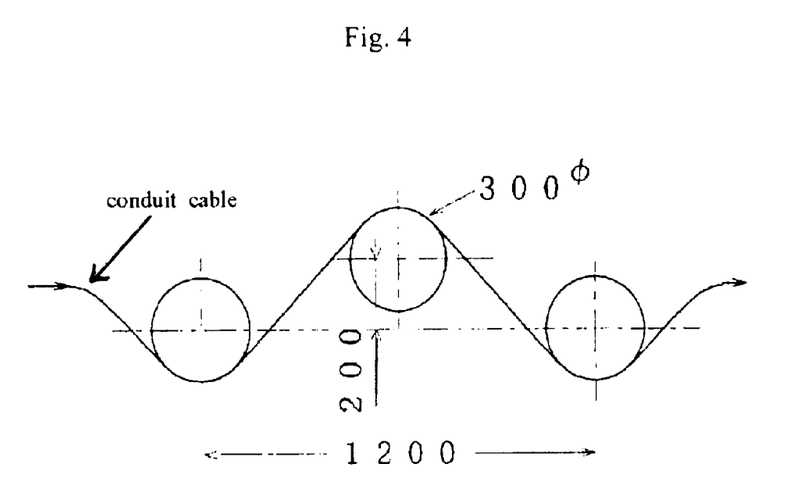
FIG. 4 is a view illustrating the arrangement of a conduit cable upon determining feedability of a wire.

By placing a steel plate having a thickness of 12 mm, a width of 10 cm and a length of 50 cm in a box having a size of 80 cm×15 cm×20 cm, welding a bead of 40 cm length on the steel plate for 2 minutes, and collecting spatter which is generated during welding, an amount of generated spatter expressed in units of mg/min was measured for the solid wire of the present invention and the conventional solid wire with copper plating under conditions given in the following Table 1. In this case, the weld conduit cable is based on w-type arrangement shown in FIG. 4. As a comparative example, the solid wire with copper plating was used under the above-described conditions.

TABLE 1

| Wire diameter (mm) | Voltage (v) | Current (A) | Gas |
|---|---|---|---|
| 1.40 | 34 | 350 | Mixture of Ar and $Co_2$ |

(b) The wire feedability was evaluated by another method in addition to an amount of generated spatter. That is, after a conduit cable is wound twice on a cylinder having a diameter of 300 mm, which is different from the w-type arrangement, a period of arcing time is measured. Because the feeding degree of the wire is very severe in the case of the two windings as described above, it is irregular and arc generation and welding work finally stops.

A time period between a weld start time and an arcing stop time becomes a parameter used to determine the superiority or inferiority of the wire feedability. Accordingly, the inventive solid wire and the conventional solid wire were compared by the above-described method.

(2) Measurement of Micro Vickers Hardness (Hv) of Flat Portion

The flat portion in FIG. 1 of a wire surface for hardness measurement is shown enlarged 1000 times and Vickers hardness (Hv) is measured under a loading weight of 1 g. At this time, the hardness was measured at 4 points on surface of the wire of respective 90 degree in the circumference direction of the cross section area. The hardness was measured at each point seven times (n=7). Maximum and minimum values of 28 hardness values were discarded and an average value of 26 hardness values was determined as hardness of a wire surface.

(3) Method for Measuring Arithmetical Average Roughness (Ra)

Roughness was measured on the basis of Japanese Industrial Standards JIS B 0601.

Arbitrarily sample wires cut having a length of 10 cm were manually straightened and then the wires were immersed in a tetrachlorocarbon solution and coating materials of the wire surface were removed by ultrasonic vibration.

Roughness of a roughness curve graph was measured on the wire surface in four directions, which are orthogonal to one another on the circumference of a circle in each of three wires (FIG. 3 shows an laterally enlarged roughness curve and a clear flat portion). Further, the Ra was measured at three corresponding positions of the flat portion of each wire. Subsequently, Ra values were measured at total 36 points.

Then, the average roughness (Ra) was determined as an average value of Ra values corresponding to the 36 points.

(4) Measurement of Ratio of Area of Lubricant-rich Pool to Unit Area of Wire Surface Twenty microphotographs of lubricant-rich pools, as shown in FIG. 1, measured in four orthogonal directions on the circumference of a circle of a wire, were obtained. Further, the number of lattice points occupied by the lubricant-rich pools was calculated on the basis of a transparent film including a lattice composed of 325 points, thereby calculating a ratio of an area of the lubricant-rich pools to a unit area (based on a point counting method). A ratio of an area of the lubricant-rich pool to a unit area of a wire surface was determined as an average value of area ratios corresponding to the 20 images.

(5) Measurement of Amount of Coating of at Least One Component Selected from Group of $MoS_2$, BN or Mixture Powder Thereof A wire having a length of 10 cm was cut to produce 50 test pieces. The test pieces were soaked in a solution of condensed hydrochloric acid and water (1:1) for 10 minutes. Then, coating materials contained in the depressions were completely separated. The solution is filtered and then residues were dissolved in an alkali solution. Concentration of Mo and B of the solution was analyzed by an induced-coupled plasma (ICP) method.

Further, the concentration of $MoS_2$ and BN was obtained from the concentration of Mo and B, and the concentration of $MoS_2$ and BN converted was expressed as a coating amount per unit surface area ($g/m^2$).

(6) Measurement of Copper Fumes

Amounts of copper fumes were measured about welding the inventive solid wire with no copper plating and the conventional solid wire with copper plating.

On the basis of straight-type arrangement of the conduit cable under conditions given in Table 1, the wire was welded for 3 minutes and generated copper fumes were absorbed through a fine quartz filter. Then, fine particles absorbed by the filter were dissolved in an acid solution, and concentration of copper was analyzed by the ICP method and the concentration of copper was expressed as an amount of generated copper fumes (mg/minute).

Rod samples of 8 mm, 6.4 mm and 5.5 mm containing C: 0.070%, Si: 0.72%, Mn: 1.50%, P: 0.016%, S: 0.010% and Ti: 0.20% used.

A pickling process and a Bonderite coating process were applied to the rods. A pickling time and acid concentration were adjusted to vary an area of lubricant-rich pools, and then roughnesses of wire surfaces sharply varied after pickling.

A wire of 1.40 mm was obtained through a dry drawing process and a wet drawing process. A reduction rate of drawing and an entire reduction angle of dies were adjusted to vary a ratio of the area of the lubricant-rich pools to a unit area and micro Vickers hardness of the wire surface in the wet drawing process. The area of the lubricant-rich pools was increased using both a compulsory lubrication method based on double dies and a compression roller method.

Then, the wire was applied to a bipolar type alkali electrolytic cleaning process and wounded after surface treatment (coating of rust-preventing oil and lubricating material).

The feedability of the wire manufactured as described above is measured by carrying out welding under conditions given in Table 1 and measuring an amount of generated spatter, an interrupted arc time, an amount of copper fumes, etc.

The following Table 2 shows characteristics of wire feedability where micro hardness and arithmetical average roughness (Ra) are varied on condition that a ratio of an area of lubricant-rich pools to a unit area is constant. As shown in Table 2, where the micro Vickers hardness (Hv) is in the range of 115 to 310 and arithmetical average roughness is in the range of 0.01 to 0.30·m, it is understood that the feedability of the inventive solid wire with no copper plating is superior to that of the conventional solid wire with copper plating. Further, it is shown that the inventive solid wire generates almost no copper fumes.

TABLE 2

| Hv (lg) | Ra (μm) | Spatter amount (mg/min) | arcing time (sec) | Copper fumes (mg/min) | Remark |
|---|---|---|---|---|---|
| 110 | 0.008 | 3010 | 15 | 0.001 | Comparative Sample |
| | 0.014 | 2610 | 26 | | Comparative Sample |
| | 0.200 | 2880 | 20 | | Comparative Sample |
| | 0.295 | 2980 | 17 | 0.001 | Comparative Sample |
| | 0.310 | 2840 | 21 | | Comparative Sample |
| 115 | 0.009 | 2900 | 15 | | Comparative Sample |
| | 0.010 | 2380 | 60 | | Inventive Sample |
| | 0.220 | 2400 | 47 | 0.001 | Inventive Sample |
| | 0.297 | 2310 | 48 | | Inventive Sample |
| | 0.312 | 3120 | 20 | | Comparative Sample |
| 250 | 0.009 | 2990 | 15 | | Comparative Sample |
| | 0.013 | 2310 | 48 | | Inventive sample |
| | 0.250 | 2350 | 45 | 0.001 | Inventive sample |
| | 0.292 | 2400 | 58 | | Inventive sample |
| | 0.305 | 2770 | 28 | | Comparative Sample |

TABLE 2-continued

| Hv (lg) | Ra (μm) | Spatter amount (mg/min) | arcing time (sec) | Copper fumes (mg/min) | Remark |
|---|---|---|---|---|---|
| 310 | 0.007 | 3020 | 12 | | Comparative Sample |
| | 0.016 | 2400 | 47 | 0.001 | Inventive sample |
| | 0.275 | 2310 | 58 | | Inventive sample |
| | 0.300 | 2200 | 59 | | Inventive sample |
| | 0.310 | 2850 | 14 | 0.001 | Comparative Sample |
| 315 | 0.007 | 2900 | 15 | | Comparative Sample |
| | 0.011 | 2650 | 17 | | Comparative Sample |
| | 0.210 | 2700 | 20 | 0.001 | Comparative Sample |
| | 0.290 | 2710 | 14 | | Comparative Sample |
| | 0.312 | 2760 | 13 | | Comparative Sample |
| 340 | 0.009 | 2900 | 14 | | Comparative Sample |
| | 0.012 | 2690 | 30 | | Comparative Sample |
| | 0.190 | 2710 | 35 | | Comparative Sample |
| | 0.295 | 2900 | 22 | 0.001 | Comparative Sample |
| | 0.309 | 2980 | 12 | | Comparative Sample |
| Solid wire with copper plating | | 2410 | 42 | 5.02 | Conventional Sample |

The following Tables 3 to 5 show that a ratio of an area of lubricant-rich pools to a unit area affects wire feedability. Where the area ratio is in the range of 15 to 88%, the micro Vickers hardness (Hv) is in the range of 115 to 310 and average roughness is in the range of 0.01 to 0.30·m, it is understood that only the wire satisfying the above-described requirements has wire characteristics equal to or better than the conventional solid wire with copper plating. Further, it is understood that the inventive solid wire generates almost no copper fumes. Table 4 and Table 5 are continuous with Table 3.

TABLE 3

| Area rate of lubricant-rich pool (%) | Hv (lg) | Ra (μm) | Spatter amount (mg/min) | arcing time (sec) | Remark |
|---|---|---|---|---|---|
| 13 | 110 | 0.008 | 2910 | 18 | Comparative Sample |
| | | 0.200 | 3060 | 15 | Comparative Sample |
| | | 0.350 | 2880 | 20 | Comparative Sample |
| | 200 | 0.007 | 2790 | 22 | Comparative Sample |
| | | 0.270 | 2810 | 23 | Comparative Sample |
| | | 0.340 | 3070 | 14 | Comparative Sample |
| | 325 | 0.009 | 3120 | 12 | Comparative Sample |
| | | 0.290 | 2690 | 26 | Comparative Sample |
| | | 0.340 | 2880 | 30 | Comparative Sample |
| 15 | 110 | 0.009 | 2910 | 19 | Comparative Sample |
| | | 0.230 | 2900 | 18 | Comparative Sample |
| | | 0.310 | 3010 | 15 | Comparative Sample |
| | 115 | 0.007 | 2780 | 29 | Comparative Sample |
| | | 0.010 | 2370 | 49 | Inventive sample |
| | | 0.210 | 2310 | 50 | Inventive sample |
| | | 0.295 | 2390 | 50 | Inventive sample |
| | | 0.314 | 2880 | 20 | Comparative Sample |
| | | 0.390 | 2700 | 24 | Comparative Sample |
| | 190 | 0.007 | 2690 | 30 | Comparative Sample |
| | | 0.200 | 2400 | 58 | Inventive sample |
| | | 0.395 | 2910 | 16 | Comparative Sample |
| | 310 | 0.008 | 3050 | 15 | Comparative Sample |
| | | 0.016 | 2370 | 49 | Inventive sample |
| | | 0.240 | 2340 | 58 | Inventive sample |
| | | 0.300 | 2330 | 60 | Inventive sample |
| | | 0.319 | 2810 | 17 | Comparative Sample |
| | | 0.400 | 2900 | 16 | Comparative Sample |

TABLE 3-continued

| Area rate of lubricant-rich pool (%) | Hv (1g) | Ra (μm) | Spatter amount (mg/min) | arcing time (sec) | Remark |
|---|---|---|---|---|---|
| | 317 | 0.005 | 3010 | 14 | Comparative Sample |
| | | 0.290 | 3210 | 12 | Comparative Sample |
| | | 0.350 | 3110 | 12 | Comparative Sample |

TABLE 4

| Area rate of lubricant-rich pool (%) | Hv (1g) | Ra (μm) | Spatter amount (mg/min) | arcing time (sec) | Remark |
|---|---|---|---|---|---|
| 60 | 112 | 0.005 | 2780 | 30 | Comparative Sample |
| | | 0.240 | 2730 | 28 | Comparative Sample |
| | | 0.390 | 2880 | 25 | Comparative Sample |
| | 255 | 0.007 | 2980 | 21 | Comparative Sample |
| | | 0.014 | 2290 | 68 | Inventive sample |
| | | 0.195 | 2340 | 61 | Inventive sample |
| | | 0.295 | 2390 | 64 | Inventive sample |
| | | 0.314 | 2770 | 35 | Comparative Sample |
| | | 0.385 | 2870 | 27 | Comparative Sample |
| | 335 | 0.004 | 2810 | 21 | Comparative Sample |
| | | 0.185 | 2910 | 21 | Comparative Sample |
| | | 0.370 | 2760 | 26 | Comparative Sample |
| 88 | 112 | 0.005 | 2690 | 22 | Comparative Sample |
| | | 0.205 | 2760 | 24 | Comparative Sample |
| | | 0.309 | 2960 | 20 | Comparative Sample |
| | 115 | 0.008 | 2840 | 16 | Comparative Sample |
| | | 0.010 | 2300 | 68 | Inventive sample |
| | | 0.200 | 2290 | 79 | Inventive sample |
| | | 0.290 | 2380 | 61 | Inventive sample |
| | | 0.310 | 2900 | 15 | Comparative Sample |
| | | 0.390 | 3010 | 14 | Comparative Sample |
| | 184 | 0.015 | 2390 | 62 | Inventive sample |
| | | 0.215 | 2310 | 55 | Inventive sample |
| | | 0.300 | 2300 | 59 | Inventive sample |
| | 310 | 0.007 | 2680 | 31 | Comparative Sample |
| | | 0.012 | 2400 | 58 | Inventive sample |
| | | 0.245 | 2390 | 62 | Inventive sample |
| | | 0.300 | 2310 | 60 | Inventive sample |
| | | 0.305 | 2900 | 17 | Comparative Sample |
| | | 0.388 | 2880 | 16 | Comparative Sample |

TABLE 4-continued

| Area rate of lubricant-rich pool (%) | Hv (1g) | Ra (μm) | Spatter amount (mg/min) | arcing time (sec) | Remark |
|---|---|---|---|---|---|
| | 319 | 0.004 | 2890 | 15 | Comparative Sample |
| | | 0.210 | 2970 | 15 | Comparative Sample |
| | | 0.370 | 2610 | 20 | Comparative Sample |

TABLE 5

| Area rate of lubricant-rich pool (%) | Hv (1g) | Ra (μm) | Spatter amount (mg/min) | arcing time (sec) | Remark |
|---|---|---|---|---|---|
| 90 | 111 | 0.008 | 3040 | 12 | Comparative Sample |
| | | 0.280 | 3010 | 11 | Comparative Sample |
| | | 0.340 | 2930 | 17 | Comparative Sample |
| | 198 | 0.003 | 2870 | 14 | Comparative Sample |
| | | 0.210 | 2810 | 18 | Comparative Sample |
| | | 0.390 | 2760 | 19 | Comparative Sample |
| | 340 | 0.007 | 2740 | 20 | Comparative Sample |
| | | 0.200 | 2730 | 22 | Comparative Sample |
| | | 0.370 | 2930 | 17 | Comparative Sample |
| 95 | 113 | 0.007 | 2680 | 24 | Comparative Sample |
| | | 0.280 | 2590 | 32 | Comparative Sample |
| | | 0.340 | 2710 | 30 | Comparative Sample |
| | 289 | 0.009 | 2630 | 33 | Comparative Sample |
| | | 0.270 | 2780 | 28 | Comparative Sample |
| | | 0.330 | 2960 | 17 | Comparative Sample |

Tables 6 to 14 show effects of coating of $MoS_2$, BN or a mixture thereof where a ratio of an area of lubricant-rich pools to a unit area is constant. Where an amount of coating of $MoS_2$, BN or a mixture thereof is in an amount of from 0.002 to 0.40 g/m², the micro Vickers hardness (Hv) is in the range of 115 to 310 and arithmetical average roughness(Ra) is in the range of 0.01 to 0.30·m, it is understood that only the wire satisfying the above-described requirements has excellent wire feedability in comparison with the conventional solid wire with copper plating. Table 7 and Table 14 are continuous with Table 6.

TABLE 6

| Coating amount (g/m⁻²) | | | Hv (1 g) | Ra (μm) | Spatter amount (g/min) | Arcing time (sec) | Remark |
|---|---|---|---|---|---|---|---|
| $MoS_2$ | BN | $MoS_2$ + BN | | | | | |
| 0.001 | — | — | 110 | 0.008 | 2780 | 21 | Comparative Sample |
| | | | | 0.200 | 2660 | 20 | Comparative Sample |
| | | | | 0.370 | 2590 | 24 | Comparative Sample |
| | | | 185 | 0.007 | 2770 | 25 | Comparative Sample |
| | | | | 0.190 | 2940 | 20 | Comparative Sample |
| | | | | 0.310 | 2590 | 27 | Comparative Sample |
| | | | 320 | 0.009 | 2690 | 27 | Comparative Sample |
| | | | | 0.018 | 2640 | 24 | Comparative Sample |
| | | | | 0.305 | 2810 | 20 | Comparative Sample |
| 0.002 | — | — | 112 | 0.004 | 2710 | 21 | Comparative Sample |
| | | | | 0.185 | 2840 | 20 | Comparative Sample |
| | | | | 0.340 | 2790 | 22 | Comparative Sample |

TABLE 6-continued

| Coating amount (g/m$^{-2}$) | | | | | Spatter amount | Arcing time | |
|---|---|---|---|---|---|---|---|
| MoS$_2$ | BN | MoS$_2$ + BN | Hv (1 g) | Ra (μm) | (g/min) | (sec) | Remark |
| | | | 115 | 0.006 | 2660 | 22 | Comparative Sample |
| | | | | 0.010 | 2180 | 278 | Inventive sample |
| | | | | 0.330 | 2680 | 30 | Comparative Sample |
| | | | 310 | 0.010 | 2290 | 290 | Inventive sample |
| | | | | 0.300 | 2200 | 355 | Inventive sample |
| | | | | 0.350 | 2610 | 31 | Comparative Sample |
| | | | 317 | 0.006 | 2780 | 29 | Comparative Sample |
| | | | | 0.220 | 2660 | 27 | Comparative Sample |
| | | | | 0.310 | 2590 | 28 | Comparative Sample |

TABLE 7

| Coating amount (g/m$^{-2}$) | | | | | Spatter amount | Arcing time | |
|---|---|---|---|---|---|---|---|
| MoS$_2$ | BN | MoS$_2$ + BN | Hv (1 g) | Ra (μm) | (g/min) | (sec) | Remark |
| 0.280 | — | — | 111 | 0.007 | 2700 | 26 | Comparative Sample |
| | | | | 0.240 | 2610 | 34 | Comparative Sample |
| | | | | 0.330 | 2660 | 30 | Comparative Sample |
| | | | 115 | 0.006 | 2570 | 38 | Comparative Sample |
| | | | | 0.010 | 2010 | 320 | Inventive sample |
| | | | | 0.198 | 1980 | 410 | Inventive sample |
| | | | | 0.295 | 1880 | 520 | Inventive sample |
| | | | | 0.310 | 2700 | 39 | Comparative Sample |
| | | | | 0.345 | 2610 | 30 | Comparative Sample |
| | | | 310 | 0.005 | 2590 | 34 | Comparative Sample |
| | | | | 0.012 | 2080 | 228 | Inventive sample |
| | | | | 0.200 | 1970 | 610 | Inventive sample |
| | | | | 0.300 | 1810 | 780 | Inventive sample |
| | | | | 0.309 | 2600 | 39 | Comparative Sample |
| | | | | 0.371 | 2560 | 37 | Comparative Sample |
| | | | 314 | 0.006 | 2710 | 28 | Comparative Sample |
| | | | | 0.210 | 2700 | 29 | Comparative Sample |
| | | | | 0.340 | 2670 | 30 | Comparative Sample |
| | | | 385 | 0.250 | 2710 | 31 | Comparative Sample |
| | | | | 0.370 | 2600 | 33 | Comparative Sample |
| 0.400 | — | — | 113 | 0.007 | 2700 | 29 | Comparative Sample |
| | | | | 0.180 | 2510 | 37 | Comparative Sample |
| | | | | 0.320 | 2590 | 38 | Comparative Sample |
| | | | 115 | 0.005 | 2680 | 36 | Comparative Sample |
| | | | | 0.010 | 1980 | 340 | Inventive sample |
| | | | | 0.220 | 2020 | 270 | Inventive sample |
| | | | | 0.295 | 1880 | 415 | Inventive sample |
| | | | | 0.305 | 2510 | 37 | Comparative Sample |
| | | | | 0.380 | 2640 | 31 | Comparative Sample |
| | | | 190 | 0.006 | 2730 | 31 | Comparative Sample |
| | | | | 0.200 | 1930 | 205 | Inventive sample |
| | | | | 0.290 | 1840 | 407 | Inventive sample |
| | | | | 0.310 | 2570 | 30 | Comparative Sample |
| | | | 310 | 0.010 | 2300 | 295 | Inventive sample |
| | | | | 0.300 | 2200 | 380 | Inventive sample |
| | | | | 0.375 | 2640 | 31 | Comparative Sample |

TABLE 8

| Coating amount (g/m$^{-2}$) | | | | | Spatter amount | Arcing time | |
|---|---|---|---|---|---|---|---|
| MoS$_2$ | BN | MoS$_2$ + BN | Hv (1 g) | Ra (μm) | (g/min) | (sec) | Remark |
| 0.040 | — | — | 110 | 0.008 | 2780 | 27 | Comparative Sample |
| | | | | 0.150 | 2740 | 20 | Comparative Sample |
| | | | | 0.320 | 2800 | 21 | Comparative Sample |

TABLE 8-continued

| Coating amount (g/m$^{-2}$) | | | | | Spatter amount | Arcing time | |
|---|---|---|---|---|---|---|---|
| MoS$_2$ | BN | MoS$_2$ + BN | Hv (1 g) | Ra (μm) | (g/min) | (sec) | Remark |
| | | | 119 | 0.006 | 2610 | 29 | Comparative Sample |
| | | | | 0.014 | 2590 | 33 | Comparative Sample |
| | | | | 0.205 | 2710 | 30 | Comparative Sample |
| | | | | 0.290 | 2680 | 36 | Comparative Sample |
| | | | | 0.310 | 2590 | 39 | Comparative Sample |
| | | | | 0.400 | 2710 | 34 | Comparative Sample |
| | | | 210 | 0.009 | 2690 | 36 | Comparative Sample |
| | | | | 0.170 | 2580 | 37 | Comparative Sample |
| | | | | 0.310 | 2610 | 39 | Comparative Sample |
| | | | 320 | 0.020 | 2710 | 30 | Comparative Sample |
| | | | | 0.190 | 2770 | 31 | Comparative Sample |
| | | | | 0.315 | 2800 | 27 | Comparative Sample |
| 0.650 | — | — | 109 | 0.004 | 2710 | 27 | Comparative Sample |
| | | | | 0.150 | 2680 | 29 | Comparative Sample |
| | | | | 0.320 | 2640 | 30 | Comparative Sample |
| | | | 195 | 0.002 | 2590 | 37 | Comparative Sample |
| | | | | 0.205 | 2610 | 30 | Comparative Sample |
| | | | | 0.340 | 2680 | 32 | Comparative Sample |
| | | | 325 | 0.006 | 2710 | 30 | Comparative Sample |
| | | | | 0.180 | 2740 | 31 | Comparative Sample |
| | | | | 0.340 | 2800 | 27 | Comparative Sample |
| — | 0.001 | — | 108 | 0.006 | 2790 | 29 | Comparative Sample |
| | | | | 0.250 | 2740 | 10 | Comparative Sample |
| | | | | 0.310 | 2880 | 20 | Comparative Sample |
| | | | 245 | 0.005 | 2760 | 22 | Comparative Sample |
| | | | | 0.195 | 2900 | 20 | Comparative Sample |
| | | | | 0.380 | 2810 | 26 | Comparative Sample |
| | | | 340 | 0.005 | 2670 | 29 | Comparative Sample |
| | | | | 0.230 | 2700 | 27 | Comparative Sample |
| | | | | 0.340 | 2740 | 29 | Comparative Sample |

TABLE 9

| Coating amount (g/m$^{-2}$) | | | | | Spatter amount | Arcing time | |
|---|---|---|---|---|---|---|---|
| MoS$_2$ | BN | MoS$_2$ + BN | Hv (1 g) | Ra (μm) | (g/min) | (sec) | Remark |
| — | 0.002 | — | 107 | 0.004 | 2660 | 30 | Comparative Sample |
| | | | | 0 210 | 2770 | 31 | Comparative Sample |
| | | | | 0.320 | 2640 | 34 | Comparative Sample |
| | | | 115 | 0.010 | 1980 | 305 | Inventive sample |
| | | | | 0.300 | 1900 | 415 | Inventive sample |
| | | | | 0.385 | 2710 | 38 | Comparative Sample |
| | | | 235 | 0.002 | 2730 | 29 | Comparative Sample |
| | | | | 0.210 | 2040 | 270 | Inventive sample |
| | | | | 0.290 | 2100 | 240 | Inventive sample |
| | | | 310 | 0.011 | 2010 | 298 | Inventive sample |
| | | | | 0.300 | 2200 | 305 | Inventive sample |
| | | | | 0.410 | 2870 | 25 | Comparative Sample |
| | | | 340 | 0.006 | 2710 | 30 | Comparative Sample |
| | | | | 0.170 | 2840 | 22 | Comparative Sample |
| | | | | 0.320 | 2590 | 29 | Comparative Sample |

TABLE 10

| Coating amount (g/m$^{-2}$) | | | | | Spatter amount | Arcing time | |
|---|---|---|---|---|---|---|---|
| MoS$_2$ | BN | MoS$_2$ + BN | Hv (1 g) | Ra (μm) | (g/min) | (sec) | Remark |
| — | 0.400 | — | 109 | 0.005 | 1640 | 30 | Comparative Sample |
| | | | | 0.210 | 1740 | 27 | Comparative Sample |
| | | | | 0.315 | 2630 | 27 | Comparative Sample |

TABLE 10-continued

| Coating amount (g/m$^{-2}$) | | | | | Spatter amount | Arcing time | |
|---|---|---|---|---|---|---|---|
| MoS$_2$ | BN | MoS$_2$ + BN | Hv (1 g) | Ra (μm) | (g/min) | (sec) | Remark |
| | | | 115 | 0.008 | 2710 | 26 | Comparative Sample |
| | | | | 0.010 | 1708 | 410 | Inventive sample |
| | | | | 0.190 | 1700 | 590 | Inventive sample |
| | | | | 0.270 | 1680 | 620 | Inventive sample |
| | | | | 0.290 | 1910 | 610 | Inventive sample |
| | | | | 0.380 | 2640 | 31 | Comparative Sample |
| | | | 235 | 0.006 | 2700 | 33 | Comparative Sample |
| | | | | 0.016 | 1890 | 470 | Inventive sample |
| | | | | 0.210 | 1940 | 400 | Inventive sample |
| | | | | 0.260 | 1710 | 660 | Inventive sample |
| | | | | 0.295 | 1680 | 740 | Inventive sample |
| | | | | 0.360 | 2660 | 33 | Comparative Sample |
| | | | 310 | 0.007 | 2740 | 30 | Comparative Sample |
| | | | | 0.300 | 2100 | 390 | Inventive sample |
| | | | | 0.320 | 2610 | 29 | Comparative Sample |
| | | | 320 | 0.005 | 2740 | 29 | Comparative Sample |
| | | | | 0.205 | 2680 | 30 | Comparative Sample |
| | | | | 0.370 | 2660 | 34 | Comparative Sample |
| — | 0.410 | — | 112 | 0.008 | 2710 | 34 | Comparative Sample |
| | | | | 0.240 | 2640 | 31 | Comparative Sample |
| | | | | 0.320 | 2700 | 27 | Comparative Sample |
| | | | 215 | 0.007 | 2740 | 28 | Comparative Sample |
| | | | | 0.170 | 2670 | 30 | Comparative Sample |
| | | | | 0.330 | 2590 | 33 | Comparative Sample |
| | | | 370 | 0.015 | 2700 | 24 | Comparative Sample |
| | | | | 0.200 | 2690 | 21 | Comparative Sample |
| | | | | 0.270 | 2710 | 20 | Comparative Sample |
| | | | | 0.350 | 2700 | 24 | Comparative Sample |

TABLE 11

| Coating amount (g/m$^{-2}$) | | | | | Spatter amount | Arcing time | |
|---|---|---|---|---|---|---|---|
| MoS$_2$ | BN | MoS$_2$ + BN | Hv (1 g) | Ra (μm) | (g/min) | (sec) | Remark |
| — | — | 0.001 | 108 | 0.007 | 1710 | 29 | Comparative Sample |
| | | | | 0.190 | 1680 | 29 | Comparative Sample |
| | | | | 0.320 | 1730 | 27 | Comparative Sample |
| | | | 195 | 0.006 | 1710 | 27 | Comparative Sample |
| | | | | 0.200 | 2740 | 31 | Comparative Sample |
| | | | | 0.330 | 2660 | 30 | Comparative Sample |
| | | | 320 | 0.005 | 2890 | 30 | Comparative Sample |
| | | | | 0.205 | 2710 | 27 | Inventive sample |
| | | | | 0.140 | 2810 | 26 | Inventive sample |
| — | — | 0.002 | 107 | 0.008 | 1880 | 23 | Comparative Sample |
| | | | | 0.015 | 1760 | 21 | Comparative Sample |
| | | | | 0.210 | 2680 | 30 | Comparative Sample |
| | | | | 0.290 | 2700 | 27 | Comparative Sample |
| | | | | 0.315 | 1900 | 20 | Comparative Sample |
| | | | | 0.380 | 2910 | 19 | Comparative Sample |
| | | | 115 | 0.005 | 1810 | 22 | Comparative Sample |
| | | | | 0.010 | 2020 | 305 | Inventive sample |
| | | | | 0.190 | 1810 | 595 | Inventive sample |
| | | | | 0.295 | 1900 | 480 | Inventive sample |
| | | | | 0.315 | 1610 | 38 | Comparative Sample |
| | | | | 0.370 | 2700 | 34 | Comparative Sample |
| | | | 208 | 0.006 | 2740 | 37 | Comparative Sample |
| | | | | 0.019 | 2040 | 395 | Inventive sample |
| | | | | 0.215 | 2000 | 390 | Inventive sample |
| | | | | 0.296 | 1910 | 485 | Inventive sample |
| | | | | 0.315 | 2600 | 34 | Comparative Sample |
| | | | | 0.400 | 2730 | 34 | Comparative Sample |
| | | | 310 | 0.006 | 2710 | 30 | Comparative Sample |
| | | | | 0.017 | 1810 | 560 | Inventive sample |
| | | | | 0.240 | 1740 | 710 | Inventive sample |
| | | | | 0.300 | 1880 | 490 | Inventive sample |
| | | | | 0.311 | 2600 | 33 | Comparative Sample |
| | | | | 0.380 | 2600 | 39 | Comparative Sample |

TABLE 11-continued

| Coating amount (g/m$^{-2}$) | | | | | Spatter amount | Arcing time | |
|---|---|---|---|---|---|---|---|
| MoS$_2$ | BN | MoS$_2$ + BN | Hv (1 g) | Ra (μm) | (g/min) | (sec) | Remark |
| | | | 318 | 0.009 | 2710 | 30 | Comparative Sample |
| | | | | 0.210 | 2800 | 21 | Comparative Sample |
| | | | | 0.290 | 2720 | 24 | Comparative Sample |

TABLE 12

| Coating amount (g/m$^{-2}$) | | | | | Spatter amount | Arcing time | |
|---|---|---|---|---|---|---|---|
| MoS$_2$ | BN | MoS$_2$ + BN | Hv (1 g) | Ra (μm) | (g/min) | (sec) | Remark |
| — | — | 0.185 | 110 | 0.006 | 2780 | 19 | Comparative Sample |
| | | | | 0.019 | 2880 | 18 | Comparative Sample |
| | | | | 0.230 | 2740 | 16 | Comparative Sample |
| | | | | 0.290 | 2900 | 14 | Comparative Sample |
| | | | | 0.315 | 2890 | 14 | Comparative Sample |
| | | | | 0.395 | 2790 | 18 | Comparative Sample |
| | | | 115 | 0.007 | 2910 | 19 | Comparative Sample |
| | | | | 0.010 | 2910 | 381 | Inventive sample |
| | | | | 0.300 | 2115 | 490 | Inventive sample |
| | | | 205 | 0.007 | 2740 | 20 | Comparative Sample |
| | | | | 0.014 | 1960 | 320 | Inventive sample |
| | | | | 0.170 | 1893 | 480 | Inventive sample |
| | | | | 0.289 | 1930 | 500 | Inventive sample |
| | | | | 0.310 | 2600 | 39 | Comparative Sample |
| | | | 310 | 0.008 | 2880 | 31 | Comparative Sample |
| | | | | 0.012 | 1880 | 410 | Inventive sample |
| | | | | 0.300 | 1910 | 370 | Inventive sample |
| | | | 320 | 0.008 | 2590 | 38 | Comparative Sample |
| | | | | 0.018 | 2710 | 32 | Comparative Sample |
| | | | | 0.210 | 2800 | 30 | Comparative Sample |
| | | | | 0.288 | 2830 | 27 | Comparative Sample |
| | | | | 0.310 | 2730 | 30 | Comparative Sample |
| | | | | 0.340 | 2660 | 33 | Comparative Sample |

TABLE 13

| Coating amount (g/m$^{-2}$) | | | | | Spatter amount | Arcing time | |
|---|---|---|---|---|---|---|---|
| MoS$_2$ | BN | MoS$_2$ + BN | Hv (1 g) | Ra (μm) | (g/min) | (sec) | Remark |
| — | — | 0.400 | 112 | 0.007 | 2740 | 30 | Comparative Sample |
| | | | | 0.150 | 2580 | 37 | Comparative Sample |
| | | | | 0.310 | 2730 | 36 | Comparative Sample |
| | | | 115 | 0.007 | 2820 | 30 | Comparative Sample |
| | | | | 0.010 | 1900 | 410 | Inventive sample |
| | | | | 0.190 | 1830 | 510 | Inventive sample |
| | | | | 0.294 | 1790 | 660 | Inventive sample |
| | | | | 0.308 | 2610 | 30 | Comparative Sample |
| | | | | 0.370 | 2710 | 31 | Comparative Sample |
| | | | 208 | 0.005 | 2680 | 32 | Comparative Sample |
| | | | | 0.020 | 1910 | 370 | Inventive sample |
| | | | | 0.170 | 1840 | 415 | Inventive sample |
| | | | | 0.293 | 1900 | 405 | Inventive sample |
| | | | | 0.314 | 2700 | 30 | Comparative Sample |
| | | | | 0.390 | 1660 | 31 | Comparative Sample |
| | | | 310 | 0.002 | 2780 | 30 | Comparative Sample |
| | | | | 0.021 | 2030 | 360 | Inventive sample |
| | | | | 0.180 | 2000 | 406 | Inventive sample |
| | | | | 0.300 | 1990 | 695 | Inventive sample |
| | | | | 0.310 | 2590 | 37 | Comparative Sample |
| | | | | 0.360 | 2710 | 34 | Comparative Sample |
| | | | 405 | 0.001 | 2710 | 34 | Comparative Sample |
| | | | | 0.205 | 2740 | 34 | Comparative Sample |
| | | | | 0.300 | 2800 | 30 | Comparative Sample |
| | | | | 0.340 | 2860 | 27 | Comparative Sample |

TABLE 14

| Coating amount (g/m$^{-2}$) | | | Hv (1 g) | Ra (μm) | Spatter amount (g/min) | Arcing time (sec) | Remark |
| --- | --- | --- | --- | --- | --- | --- | --- |
| MoS$_2$ | BN | MoS$_2$ + BN | | | | | |
| — | — | 0.412 | 107 | 0.004 | 2890 | 30 | Comparative Sample |
| | | | | 0.021 | 2780 | 28 | Comparative Sample |
| | | | | 0.290 | 2730 | 24 | Comparative Sample |
| | | | | 0.310 | 2600 | 23 | Comparative Sample |
| | | | 206 | 0.009 | 2680 | 26 | Comparative Sample |
| | | | | 0.187 | 2790 | 25 | Comparative Sample |
| | | | | 0.310 | 2710 | 24 | Comparative Sample |
| | | | 325 | 0.190 | 2810 | 18 | Comparative Sample |
| | | | | 0.205 | 2870 | 17 | Comparative Sample |
| | | | | 0.314 | 2760 | 18 | Comparative Sample |
| | | | | 0.330 | 2640 | 22 | Comparative Sample |

The present invention as disclosed in the accompanying claim 1 provides a solid wire for arc welding having excellent feedability without copper plating by adjusting micro Vickers hardness and arithmetical average roughness of a flat portion of the wire surface. Further, the feedability of the inventive solid wire with no copper plating is equal or superior to that of the conventional solid wire with copper plating, thereby improving weld workability. Furthermore, consumption of energy during manufacture of the solid wire can be reduced because the solid wire is manufactured without copper plating, and a welding work environment can be improved because copper fumes are not generated.

In accordance with the present invention as disclosed in the accompanying claim 2, friction-reducing materials fed into a flat portion of a wire surface are not exhausted, thereby implementing excellent feedability.

In accordance with the present invention as disclosed in the accompanying claim 3 because the lubricant-rich pools are completely formed by depressions in which a drawing lubricant material is completely removed, the lubricant-rich pools can be sufficiently filled with at least one component selected from a group of MoS$_2$, BN and a mixture thereof, thereby implementing excellent feedability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A solid wire for arc welding, comprising:

A smooth portion of a wire surface with no copper plating, wherein micro Vickers hardness (Hv) of the smooth portion is in the range of 115 to 310 and arithmetical average roughness (Ra) of the smooth portion is in the range of 0.01 to 0.3·m.

2. The solid wire as set forth in claim 1, wherein a ratio of an area of lubricant-rich pools to a unit area of the wire surface is in the range of 15 to 88%.

3. The solid wire as set forth in claim 1, wherein at least one component selected from a group of MoS$_2$, BN and a mixture thereof is coated on the wire surface in an amount of from 0.002 to 0.40 g/m$^2$.

* * * * *

UNITED STATES PATENT AND TRADEMARK OFFICE
CERTIFICATE OF CORRECTION

PATENT NO. : 6,906,286 B2
DATED : June 14, 2005
INVENTOR(S) : Yamaoka Yukio and Geun Chul Song It is certified that error appears in the above-identified patent and that said Letters Patent is hereby corrected as shown below:

Title page,
Item [57], ABSTRACT,
Line 6, change "of the flat portions in the range of 0.01 to 0.30·m." to
-- of the flat portions in the range of 0.01 to 0.30 $\mu$m. --.

Column 3,
Line 22, change "0.01 to 0.03·m. In this case, a ratio of an area of lubricant-" to
-- 0.01 to 0.3 $\mu$m. In this case, a ratio of an area of lubricant- --.

Column 4,
Line 40, change "hardness corresponding to a portion below 1·m from the" to
-- hardness corresponding to a portion below 1 $\mu$m from the --.

Column 6,
Line 33, change "is in the range of 0.01 to 0.03·m." to -- is in the range of 0.01 to 0.03 $\mu$m. --.
Lines 33 and 34, change "As the smoothing proceeds from the Ra of 0.01·m." to
-- As the smoothing proceeds from the Ra of 0.01 $\mu$m. --.
Line 38, change "0.01·m. Further, as the arithmetical average roughness (Ra)" to
-- 0.01 $\mu$m. Further, as the arithmetical average roughness (Ra) --.
Line 39, change "exceeds 0.03·m, prominences are increased on the wire"
to -- exceeds 0.03 $\mu$m, prominences are increased on the wire --.

Column 9,
Line 45, change "the range of 0.01 to 0.30·m, it is understood that the"
to -- the range of 0.01 to 0.30 $\mu$m, it is understood that the --.

Column 10,
Line 29, change "average roughness is in the range of 0.01 to 0.30·m, it is"
to -- roughness is in the range of 0.01 to 0.30 $\mu$m, it is. --.

UNITED STATES PATENT AND TRADEMARK OFFICE
CERTIFICATE OF CORRECTION

PATENT NO.    : 6,906,286 B2
DATED         : June 14, 2005
INVENTOR(S)   : Yamaoka Yukio and Geun Chul Song It is certified that error appears in the above-identified patent and that said Letters Patent is hereby corrected as shown below:

Column 12,
Line 44, change "is in the range of 0.01 to 0.30·m, it is understood that only" to
-- is in the range of 0.01 to 0.30 $\mu$m, it is understood that only --.

Signed and Sealed this

Twenty-second Day of November, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,906,286 B2 | Page 1 of 1 |
| APPLICATION NO. | : 10/414111 | |
| DATED | : June 14, 2005 | |
| INVENTOR(S) | : Yamaoka Yukio et al. | |

It is certified that error appears in the above-identified patent and that said Letters Patent is hereby corrected as shown below:

Column 3, line 22, change "0.01 to 0.3 $\mu$m. In this case, a ratio of an area of lubricant-"

to

-- 0.01 to 0.30 $\mu$m. In this case, a ratio of an area of lubricant- --

Column 6, line 33, change "is in the range of 0.01 to 0.03 $\mu$m."

to

-- is in the range of 0.01 to 0.30 $\mu$m. --

Column 6, line 39, change "exceeds 0.03 $\mu$m, prominences are increased on the wire"

to

-- exceeds 0.30 $\mu$m, prominences are increased on the wire --

Signed and Sealed this

Fourth Day of September, 2007

JON W. DUDAS
*Director of the United States Patent and Trademark Office*